United States Patent [19]

Tsuchida et al.

[11] Patent Number: 5,153,305

[45] Date of Patent: Oct. 6, 1992

[54] CATALYTIC PROCESS FOR PREPARING POLYARYLENE THIOETHER

[75] Inventors: Eishun Tsuchida; Hiroyuki Nishide; Kimihisa Yamamoto, all of Tokyo; Mitsutoshi Jikei, Kawagoe, all of Japan

[73] Assignees: Research Institute For Production Development, Kyoto; Idemitsu Petrochemical Co., Ltd., Tokyo, both of Japan

[21] Appl. No.: 543,834

[22] PCT Filed: Dec. 15, 1989

[86] PCT No.: PCT/JP89/01258

§ 371 Date: Jul. 11, 1990

§ 102(e) Date: Jul. 11, 1990

[87] PCT Pub. No.: WO90/06961

PCT Pub. Date: Jun. 28, 1990

[30] Foreign Application Priority Data

Dec. 22, 1988 [JP] Japan .................. 63-324033

[51] Int. Cl.$^5$ .................. C08G 75/04; C08G 75/14
[52] U.S. Cl. .................. 528/373; 528/374
[58] Field of Search .................. 528/373

[56] References Cited

FOREIGN PATENT DOCUMENTS 63-213526 9/1988 Japan .
63-213527 9/1988 Japan .
63-241032 10/1988 Japan .
  698988 11/1979 U.S.S.R. .

Primary Examiner—Harold D. Anderson
Attorney, Agent, or Firm—Frishauf, Holtz, Goodman & Woodward

[57] ABSTRACT

A process for preparing a polyarylene thioether, comprising oxidation polymerizing at least one compound selected from the group consisting of diaryl disulfides represented by the formula (I):

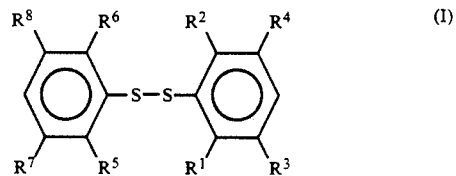

wherein, S is a sulfur atom, $R^1$ to $R^8$ are identical or different and each is a hydrogen atom, an alkyl group having 1 to 10 carbon atoms, a halogen atom or an alkoxyl group having 1 to 10 carbon atoms, with at least one catalyst selected from the group consisting of vanadyl acetylacetonato, vanadyltetraphenyl porphyrin, vanadium acetylacetonato, vanadyl porphyrin, vanadium porphyrin, oxymolybdenum acetylacetonato and oxytungsten acetylacetonato, in the presence of an acid. Reaction conditions of the process are very mild, and the process is relatively simple and easy. In addition, the process is commercially advantageous in that very inexpensive reactants and catalysts can be used.

15 Claims, No Drawings

CATALYTIC PROCESS FOR PREPARING POLYARYLENE THIOETHER

TECHNICAL FIELD

The present invention relates to a process for preparing a polyarylene thioether, more particularly to a process for preparing a polyarylene thioether such as polyphenylene thioether under mild polymerization conditions with a simple and easy procedure at a low cost.

BACKGROUND ART

Polyarylene thioethers including polyphenylene thioether have heretofore been prepared by condensation polymerization of an aromatic dihalide and an alkali metal sulfide in a polar solvent at a high temperature under pressure.

This condensation polymerization has, however, such problems that (i) an alkali metal salt remains in polyarylene thioether and deteriorates its electrical properties and (ii) this production cost is high because a great amount of energy is consumed due to carrying out polymerization at a high temperature under pressure.

A process in which thiophenol monomer is polymerized in the presence of a catalyst such as $MoCl_5/CF_3COOH$ is disclosed in USSR Patent No. 698,988. However, the product resulting from that process is poly(arylene thiol), and the process is not advantageous in industrial use since the catalyst used is expensive.

Furthermore, another process using sulfuric acid as a catalyst is known, but said process has such a disadvantage that much by-products and a considerable amount of cross-linked polymers are produced.

Processes for preparing polyarylene thioethers using diphenyldisulfide and/or thiophenol have been disclosed also in Japanese Patent Application Laid-Open Nos. 213526/1988 and 213527/1988, but they have the problems that expensive Lewis acids and oxidizing agents must be used in large amounts.

The present invention was accomplished under above circumstances, and the object of it is to dissolve the problems mentioned above, and to provide a process, which is greatly advantageous in industrial use, for producing a polyarylene thioether having excellent electric, mechanical and chemical properties, particularly a substantially straight-chain polyarylene thioether with little by-production of cross-linked polymers, with a simple and easy procedure, under mild polymerization conditions, and at a low cost.

DISCLOSURE OF THE INVENTION

The present inventors have earnestly investigated so as to overcome the problems mentioned above. As the result, it was found that the above object could be attained by using diaryl disulfides or thiophenols as the reaction material, and polymerizing them with oxygen in the presence of catalyst. The present invention has been completed based on such findings.

That is, the present invention provides a process for preparing a polyarylene thioether (or a polyarylene sulfide), which comprises oxidation coupling polymerization, with oxygen, of at least one compound selected from the group consisting of diaryl disulfides represented by the general formula (I):

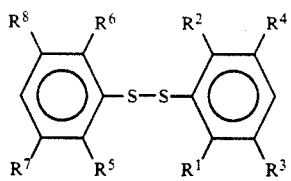

(wherein S indicates a sulfur atom, $R^1$ to $R^8$ are each a hydrogen atom, an alkyl group having 1 to 10 carbon atoms, a halogen atom, or an alkoxyl group having 1 to 10 carbon atoms, and $R^1$ to $R^8$ may be different from or indentical with each other) and thiophenols (or arylthiols) represented by the general formula (II):

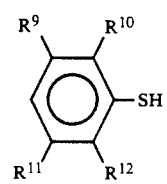

(wherein $R^9$ to $R^{12}$ are each a hydrogen atom, an alkyl group having 1 to 10 carbon atoms, a halogen atom or a alkoxyl group having 1 to 10 carbon atoms, and $R^9$ to $R^{12}$ may be different from or identical with each other), with the use of catalyst, in the presence of an acid.

BEST MODE FOR CARRYING OUT THE INVENTION $R^1$ to $R^{12}$ in the abovementioned general formulae (I) and (II) will be explained in detail as follows.

Specific examples of $R^1$ to $R^{12}$ to are hydrogen atom; alkyl groups having 1 to 10 carbon atoms such as methyl group, ethyl group, propyl group, 1-methylethyl group, butyl group, 1-methylpropyl group, 2-methylpropyl group, 1,1-dimethylethyl group, pentyl group, hexyl group, heptyl group and octyl group; halogen atom such as fluorine atom, chlorine atom, bromine atom and iodine atom; and alkoxyl groups having 1 to 10 carbon atoms such as methoxyl group, ethoxyl group, propoxyl group, isopropoxyl group, butoxyl group, isobutoxyl group, sec-butoxyl group, tert-butoxyl group, pentyloxyl group, and hexyloxyl group.

Among these examples, preferred ones are hydrogen atom, lower alkyl groups such as methyl group or ethyl group, fluorine atom or chlorine atom, and lower alkoxyl group such as methoxyl, and particularly preferred are hydrogen atom, methyl group, ethyl group and chlorine atom.

In the process of the present invention, various kinds of polyarylene thioethers (homopolymer, copolymer, or mixture or compositions thereof) are obtained by homopolymerization or copolymerization of one or plural kinds of compounds selected from the diaryl disulfides represented by the general formula (I) and the thiophenols represented by the general formula (II).

In the present invention, a polyarylene thioether having the principal chain structure represented by the general formula (III):

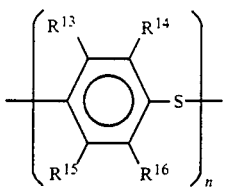
(III)

($R^{13}$ to $R^{16}$ in the formula (III) have each the same meaning as that of $R^1$ to $R^{12}$ to in the formulae (I) and (II), respectively, and n is an integer of 3 to 10,000, preferably 3 to 1,000), particularly a straight-chain polyarylene thioether with very little cross-linkage can be obtained by (co)polymerization of a diarylene disulfide represented by the general formula (I) and/or a thiophenol represented by the general formula (II).

Therein, in case a polyarylene thioether as homopolymer is desired to produce, one kind of the diaryl disulfides represented by the general formula (I) or the thiophenols represented by the general formula (II) should be used singly as the starting material.

Examples of diaryl disulfides represented by the general formula (I) are symmetrical diaryl disulfides such as diphenyl disulfide, 2,2'-dimethyldiphenyl disulfide, 3,3'-dimethyldiphenyl disulfide, 2,2',6,6'-tetramethyldiphenyl disulfide, 2,2',3,3'-tetramethyldiphenyl disulfide, 2,2',5,5'-tetramethyldiphenyl disulfide, 3,3',5,5'-tetramethyldiphenyl disulfide, 2,2',3,3',5,5'-hexamethyldiphenyl disulfide, 2,2',3,3',6,6'-hexamethyldiphenyl disulfide, 2,2',3,3',5,5',6,6'-octamethyldiphenyl disulfide, 2,2'-diethyldiphenyl disulfide, 3,3'-diethyldiphenyl disulfide, 2,2',6,6',-tetraethyldiphenyl disulfide, 2,2',3,3',6,6'-hexaethyldiphenyl disulfide, 2,2',3,3',5,5',6,6'-octaethyldiphenyl disulfide, 2,2'-dipropyldiphenyl disulfide, 3,3'-dipropyldiphenyl disulfide, 2,2',5,5'-tetrapropyldiphenyl disulfide, 2,2'-dibutyldiphenyl disulfide, 2,2'-dipentyldiphenyl disulfide, 2,2'-dihexyldiphenyl disulfide, 2,2'-difluorodiphenyl disulfide, 2,2'-dichlorodiphenyl disulfide, 2,2'-dibromodiphenyl disulfide, 2,2'-diiododiphenyl disulfide, 3,3'-difluorodiphenyl disulfide, 3,3'-dichlorodiphenyl disulfide, 3,3'-dibromodiphenyl disulfide, 3,3'-diiododiphenyl disulfide, 2,2',3,3'-tetrafluorodiphenyl disulfide, 2,2',3,3'-tetrachlorodiphenyl disulfide, 2,2',5,5'-tetrafluorodiphenyl disulfide, 2,2',5,5'-tetrachlorodiphenyl disulfide, 2,2',6,6'-tetrafluorodiphenyl disulfide, 2,2',6,6'-tetrachlorodiphenyl disulfide, 2,2',6,6'-tetrabromodiphenyl disulfide, 3,3',5,5'-tetrafluorodiphenyl disulfide, 3,3',5,5'-tetrachlorodiphenyl disulfide, 2,2',3,3',5,5'-hexafluorodiphenyl disulfide, 2,2',3,3',5,5'-hexachlorodiphenyl disulfide, 2,2',3,3',6,6'-hexafluorodiphenyl disulfide, 2,2',3,3',6,6'-hexachlorodiphenyl disulfide, 2,2',3,3',5,5',6,6'-octafluorodiphenyl disulfide, 2,2',3,3',5,5',6,6'-octachlorodiphenyl disulfide, 2,2'-dimethoxydiphenyl disulfide, 2,2'-diethoxydiphenyl disulfide, 2,2'-diisopropoxydiphenyl disulfide, 2,2'-dipropoxydiphenyl disulfide, 2,2'-dibutoxydiphenyl disulfide, 2,2',3,3'-tetramethoxydiphenyl disulfide, 2,2',6,6'-tetramethoxydiphenyl disulfide, 2,2',6,6'-tetraethoxydiphenyl disulfide, 3,3'-dimethoxydiphenyl disulfide, and 2,2',5,5'-tetramethoxydiphenyl disulfide; and asymmetrical diaryl disulfides such as 2-methyldiphenyl disulfide, 2-ethyldiphenyl disulfide, 2-propyldiphenyl disulfide, 2-butyldiphenyl disulfide, 2-fluorodiphenyl disulfide, 2-chlorodiphenyl disulfide, 2-methoxydiphenyl disulfide, 2,6-dimethyldiphenyl disulfide, 2,6-diethyldiphenyl disulfide, 2,6-difluorodiphenyl disulfide, 2,3-dimethyldiphenyl disulfide, 2,3,5,6-tetrafluorodiphenyl disulfide, 2,3,5,6-tetramethyldiphenyl disulfide, 2,3,6-trimethyldiphenyl disulfide, 2,6-dimethyl-2'-methyldiphenyl disulfide, 2,6-dimethyl-2'-ethyldiphenyl disulfide, 2,6-dimethyl-2',3',5',6'-tetrafluorodiphenyl disulfide, 2,6-dimethyl-2'-methoxydiphenyl disulfide, 2,6-diethyl-2'-methyldiphenyl disulfide, 2,6-diethyl-2'-ethyldiphenyl disulfide, 2,6-diethyl-2',3',5',6'-tetrafluorodiphenyl disulfide, 2,6-dimethyl-2',6'-diethyldiphenyl disulfide, 2,6-dimethyl-2',6'-difluorodiphenyl disulfide and 2,3,5,6-tetramethyl-2',3',5',6'-tetrafluorodiphenyl disulfide.

Specific examples of the thiophenols represented by the general formula (II) are thiophenol, 2-methylthiophenol, 2-ethylthiophenol, 2-propylthiophenol, 2-(1-methylethyl)thiophenol, 2-butylthiophenol, 2-(1-methylpropyl)thiophenol, 2-(2-methylbutyl)thiophenol, 2-(1,1-dimethylethyl)thiophenol, 2-pentylthiophenol, 2-hexylthiophenol, 2-octylthiophenol, 2-fluorothiophenol, 2-chlorothiophenol, 2-bromothiophenol, 2-iodothiophenol, 2-methoxythiophenol, 2-ethoxythiophenol, 2-propoxythiophenol, 2-butoxythiophenol, 2-sec-butoxythiophenol, 2-isobutoxythiophenol, 2-tert-butoxythiophenol, 2-pentyloxythiophenol, 2-hexyloxythiophenol, 2,6-dimethylthiophenol, 2,6-diethylthiophenol, 2-methyl-6-ethylthiophenol, 2,6-difluorothiophenol, 2-methyl-6-fluorothiophenol, 2-ethyl-6-fluorothiophenol, 2,6-dibromothiophenol, 2-methyl-6-chlorothiophenol, 2,6-dimethoxythiophenol, 2-methyl-6-methoxythiophenol, 2,3-dimethylthiophenol, 2,3-diethylthiophenol, 2,3-difluorothiophenol, 2-methyl-3-fluorothiophenol, 2-fluoro-3-methylthiophenol, 2,3-dimethoxythiophenol, 2-methyl-3-methoxythiophenol, 2,3-dichlorothiophenol, 2-methyl-3-chlorothiophenol, 3-chloro-2-methylthiophenol, 2,5-dimethylthiophenol, 2,5-difluorothiophenol, 2,5-diethylthiophenol, 2-methyl-5-fluorothiophenol, 2-methyl-5-ethylthiophenol, 2-fluoro-5-methylthiophenol, 2,5-dichlorothiophenol, 2,5-dimethoxythiophenol, 2-methyl-5-chlorothiophenol, 2-methyl-5-methoxythiophenol, 2-chloro-5-methylthiophenol, 2-methoxy-5-methylthiophenol, 2-chloro-5-fluorothiophenol, 2-ethyl-5-chlorothiophenol 2-chloro-5-ethylthiophenol, 3,5-dimethylthiophenol, 3,5-difluorothiophenol, 3,5-dimethoxythiophenol, 3,5-diethylthiophenol, 3,5-dichlorothiophenol, 3-methyl-5-fluorothiophenol, 3-methyl-5-chlorothiophenol, 3-methyl-5-methoxythiophenol, 2,3,5-trimethylthiophenol, 2,3,5-trifluorothiophenol, 2,3,5-triethylthiophenol, 2,3,5-trichlorothiophenol, 2-methyl-3,5-difluorothiophenol, 2,3,5,6-tetramethylthiophenol, 2,3,5,6-tetrafluorothiophenol, 2,3,5,6-tetrachlorothiophenol, 2,3,5,6-tetramethoxythiophenol, 2,3,5,6-tetraethylthiophenol, 2,6-dimethyl-3,5-tetrafluorothiophenol, 2,6-diethyl-3,5-difluorothiophenol, 2,6-diethyl-3,5-dichlorothiophenol, 2,6-diethyl-3,5-dimethylthiophenol, 2,6-diethyl-3,5-dimethoxythiophenol, 2,6-dimethyl-3,5-dichlorothiophenol and 2-methyl-6-ethyl-3,5-difluorothiophenol.

Among these examples, particularly preferred ones are thiophenol, 2-methylthiophenol, 2-ethylthiophenol, 2-fluorothiophenol, 2-chlorothiophenol, 2-methoxythiophenol, 2,6-dimethylthiophenol, 2,6-diethylthiophenol, 2,6-difluorothiophenol, 2,6-dichlorothiophenol, 2,6-dimethoxythiophenol, 2,3,5,6-tetrachlorothiophenol and 2,3,5,6-tetramethylthiophenol.

As the catalyst used for the process of the present invention, salts of the Group VA or VIA metals in the Periodic Table are suitably used. The ligands to constitute said metal salts or counter ions are not critical. Preferred are metal salts containing organic ligands, particularly metal salts with acetylacetone, porphyrin or the like.

Examples of these compounds of Group VA or VIA metals are vanadium compounds such as vanadyl acetylacetonato (VO(acac)$_2$), vanadyltetraphenyl porphyrin (VOTPP), vanadium acetylacetonato, and vanadium porphyrin; molybdenum oxides such as oxymolybdenum acetylacetonato (MoO$_2$(acac)$_2$), and molybdenum (VI) oxide; and tungsten oxides such as oxytungsten acetylacetonato (WO$_2$(acac)$_2$).

Among them, particularly preferable are vanadyl acetyl acetonato (VO(acac)$_2$) and vanadyltetraphenyl porphyrin (VOTPP).

Said metal salts including these compounds may be used singly or in combination of two or more thereof in mixed or complexed form.

The acids used in the present invention are proton acids or substances which can partly changes to proton acids with the presence of proton donors, including well-known organic or inorganic acids or mixtures or complexes thereof. Specific examples of them are non-oxoacids such as hydrochloric acid, hydrobromic acid and prussic acid; inorganic oxoacids such as sulfuric acid, phosphoric acid, chloric acid, bromic acid, nitric acid, carbonic acid, boric acid, molybdic acid, isopolyacid, and heteropoly-acid; partial salts or partial esters such as sodium hydrogen sulfate, sodium dihydrogen phosphate, proton-containing heteropoly-acid, monomethylsulfuric acid, and trifluoromethylsulfuric acid; compounds usable as a proton acid when dissolved in a solvent or decomposed, such as ammonium chloride, ammonium phosphate, ammonium sulfate and ammonium heteropoly-acid; mono- or polycarboxylic acids such as acetic acid, propionic acid, butanoic acid, succinic acid, benzoic acid and phthalic acid; halogen-substituted carboxylic acids such as monochloroacetic acid, dichloroacetic acid, trichloroacetic acid, monofluoroacetic acid, difluoroacetic acid and trifluoroacetic acid; mono- or polysulfonic acids such as methanesulfonic acid, ethanesulfonic acid, propanesulfonic acid, benzenesulfonic acid, toluenesulfonic acid, trifluoromethanesulfonic acid, and benzenedisulfonic acid; and partial metal salts of polysulfonic acids such as sodium benzenesulfonate.

Among these acids, preferred are strong proton acids which are non-volatile and highly stable, most preferably sulfuric acid, trifluoroacetic acid, and trifluoro methane sulfonic acid.

These acids may be used singly or in a mixed form or complexed form of two or more thereof.

The acids appear to have catalytic action to oxidation reaction in the polymerization.

In the process of the present invention, at least one compound selected from the group consisting of the diaryl disulfides represented by the general formula (I) and the thiophenols represented by the general formula (II) is subjected to oxidation coupling polymerization in the presence of at least one compound or composition selected from the above acids, with the use of beforementioned catalyst, to prepare a polyarylene thioether.

Said polymerization can be carried out in the absence of a solvent but preferably in the presence of a solvent.

As the solvent, various compounds which do not substantially lose the polymerization activity, can be used, but such compounds that can dissolve the monomer and acids usually used are preferred.

Preferred examples of the solvents are usually nitromethane, dichloromethane, dibromoethane, tetrachloroethane, nitrobenzene and the like. In addition, solvents used in Friedel-Crafts reaction or cationic polymerization can suitably be used in the present invention.

These solvents may be used singly or in a mixture of two or more thereof, or optinally mixed with an inert solvent including an aromatic hydrocarbon such as benzene and toluene.

Said polymerization is preferably carried out in the presence of dehydrating agent, because water comes out as the polymerization proceeds.

Usually, preferred dehydrating agents are anhydrides such as acetic anhydride, trifluoroacetic anhydride, and trifluoromethane sulfonic anhydride.

In addition, any dehydrating agents can be used as long as it has no influence on the polymerization, and specifically, anhydrous sodium sulfate, calcium chloride and the like can be used.

In the said polymerization, oxygen is required to exist. Usually, higher oxygen partial pressure is preferred. But, the polymerization can be carried out at atmospheric pressure or reduced pressure.

The proportion of said catalyst (Catalyst A) and diaryl disulfide and/or thiophenol (Monomer B) used in the polymerization reaction, i.e., Catalyst A/Monomer B (in molar ratio) is usually 5 to 0.00001, preferably 1 to 0.0005, and more preferably 0.1 to 0.005.

If the ratio is less than 0.00001, then the polymerization rate becomes low, or if it is in excess of 5, the catalyst costs high, which is economically disadvantageous.

The concentration of monomers, i.e., the total concentration of the diaryl disulfides and the thiophenols is not critical. When the diaryl disulfides and/or the thiophenols are in liquid state at polymerization temperature, bulk polymerization with monomer itself as the solvent can be carried out. Usually, favorable concentration of the monomers is in the range of $10^{-4}$ to 10 mol/l.

The amount of the acids and dehydrating agents vary with kinds or compositions of the acid, kinds of the monomer and solvents, concentration of impurities such as water in the reaction system and reaction temperature, and accordingly can hardly be specified unconditionally, but these amounts should be at least in such a range that said polymerization reaction can start, and side reactions such as decomposition reaction other than the aimed polymerization reaction should be inhibited.

The presence of water in the polymerization has various effects on the polymerization, for example, it will raise polymerization rate, or reduce the polymerization activity. If the water content exceeds a certain value, the polymerization activity may be considerably reduced. Therefore, the water content should desirably be within an allowable range. Said allowable range of the water content vary with the kinds of the acids and solvents used, and therefore, are not limited, but it is usually not higher than 0.1 mol %.

The temperature for the polymerization varies with the kinds of the acids or monomers used, but usually $-5°$ to $150°$ C., and preferably $0°$ to $50°$ C.

Reaction pressure and oxygen partial pressure are not critical, but usually reactions can preferably be carried out under atmospheric pressure or the autogenous pressure of the reaction system. If necessary, the polymerization can be carried out under pressure using the mixed gas with diluted gas which does not interfere with the reaction.

The period of reaction also varies with the kinds of acids or monomers to be used, proportions thereof, and reaction conditions such as reaction temperature, partial pressure of oxygen, proportion of catalyst, solvents, but usually it is 0.5 to 100 hours, preferably 2 to 50 hours.

In constituting the said polymerization reaction system, the order or method of introducing the said catalyst, diaryl disulfides, thiophenols and the solvents are not critical, and these may be introduced together into the reaction system or gradually in various orders or methods.

The style for reaction is not critical, and either of continuous system, semicontinuous system or batch system may be employed. In case of the batch system, agitation of the reaction system is preferred.

According to the above procedures, desired polyarylene thioether can be obtained in solution after the reaction.

The post-treatments may be carried out in accordance with various known methods. An example of the post-treatment after the solution polymerization is as follows.

When the polymerization is completed or proceeds to a necessary extent, the reaction mixture is contacted with water, a lower alcohol such as methanol or a mixture thereof to deactivate the catalyst and the precipitate the resulting polymer. In that case, a polymerization terminator, such as a basic material may be used together, if necessary.

In the said post-treatment, it is not inevitable to contact the reaction mixture with poor solvent or basic substance, but in case a polymer precipitates in the polymerization solvent during polymerization, said polymer can be separated to be dried while the polymerization is continued.

The precipitated polymer is separated from the liquid (the reaction mixture) by a usual separation technique such as filtration and, if necessary, it is washed or neutralized with aqueous alkali solution. Further, if necessary, said polymer may be repeatedly subjected to dissolution and reprecipitation with a proper solvent and reprecipitation luquid, separation, and washing with methanol, and then it is dried and can be recovered as polyarylene thioether having various purities.

As the solvent for the above dissolution and the reprecipitation, N-methylpyrrolidone, for instance, is preferably used, because it can efficiently dissolve the polymer.

As the reprecipitating liquid and washing liquid mentioned above, water, methanol or mixture thereof is usually used, and particularly methanol is preferred.

On the other hand, unreacted monomers, low molecular weight byproducts, and solvent in the mixed liquid from which the polymer is separated can be purified and recovered by a usual distillation and recycled to the reaction system or post-treatment, or effectively utilized in various other applications.

The polyarylene thioethers such as polyphenylne thioether obtained according to the process of the present invention are excellent in heat resistance and chemical resistance, and are superior in mechanical properties such as rigidity, strength, impact resistance, and anti-wear properties. Particularly, it is remarkably excellent in electric properties including insulation resistance, for it is free of salts such as sodium chloride which lowers the insulation resistance of the polymer, and have been a problem. Furthermore, said polymer serves as engineering plastics favorable for processing, because of its substantial straight-chain structure. Accordingly, it can suitably be used as parts for apparatus or mechanical parts or materials in electronic or electric fields, mechanical fields or various fields such as paints, automobiles and chemicals.

According to the process mentioned above, reaction mixture containing the desired polymer can be obtained.

The desired polymer can be recovered in various purity and in various form by subjecting appropriate post-treatment on the said reaction mixture.

The present invention will be described in greater detail with reference to the following examples.

EXAMPLE 1

At an oxygen partial pressure of 2 atm, 2.18 g of diphenyl disulfide as monomer was dissolved in 100 ml of 1,1,2,2-tetra-chloroethane. To the resulting solution was added 0.26 g of vanadyl acetylacetonato as catalyst (catalyst/monomer = 1/20 (molar ratio)), 0.10 g of trifluoromethane sulfonic acid and 4.20 g of trifluoroacetic anhydride, and then the resulting mixture was stirred for about one day. The reaction solution was dropped into acidic methanol containing hydrochloric acid to produce a white precipitate. The precipitate was filtrated, washed, and dried to obtain a white powder (1.70 g). The result of analyzing said powder is as follows.

| | |
|---|---|
| Elementary Analysis (values in parentheses are calculated) | C; 65.92% (66.6%) H; 3.76% (3.70%) S; 30.21% (26.6%) Li, Na, K, Cu: 0 ppm N; not more than 10 ppm |
| IR Spectrum: | $\nu_{C-H}$ = 3000, 3050 cm$^{-1}$ $\nu_{C=C}$ = 1390, 1440, 1475, 1575 cm$^{-1}$ $\delta_{C-H}$ = 820 cm$^{-1}$ |
| X-ray Diffraction: | $\sigma$ = 9.5, 10.5° |
| Yield: | 78% |
| Melting point: | 192° C. |

Above results confirmed that said white powder is poly(p-phenylenesulfide) (or poly(p-phenylene thioether)) of high purity.

EXAMPLE 2

In atmosphere, 1.65 g of 2,6-diethylthiophenol as monomer was dissolved into 50 ml of nitromethane. The resulting solution was mixed with 1.27 g of iodine, and stirred for one hour and mixed with 0.03 g of vanadyl tetraphenyl porphyrin (VOTPP) as catalyst (catalyst/monomer = 1/100 (molar ratio)), 0.08 g of trifluoromethane sulfonic acid and 1.02 g of acetyl anhydride, and reacted for 40 hours at 0° C.

The reaction solution was dropped into acidic methanol containing hydrochloric acid to produce a white precipitate. The precipitate was purified by dissolving in N-methylpyrrolidone and reprecipitating with methanol. As the result, 1.40 g of poly(2,6-diethylphenylene sulfide) powder (or poly(2,6-diethylphenylene thioether) powder) was obtained. The yield of this powder was 85%, and the melting point was 230° C.

The result of analyzing the resulting product was as follows.

| IR Spectrum: | $\nu_{C-H}$ = 2840, 2945, 2980 cm$^{-1}$ |
| --- | --- |
| | $\nu_{C=C}$ = 1380, 1465 cm$^{-1}$ |
| | $\delta_{C-H}$ = 890 cm$^{-1}$ |
| $^1$H-NMR: | $\delta$(—CH$_3$) = 1.25 ppm |
| | $\delta$(—C$_2$H$_5$) = 2.79 ppm |
| | $\delta$(phenyl) = 7.00 ppm |
| Elementary Analysis | C; 71.5% (73.2%) |
| (values in parentheses | H; 7.91% (7.30%) |
| are calculated) | S; 19.4% (19.5%) |

EXAMPLE 3

In atmosphere, 1.37 g of bis(2-methylphenyl)disulfide as monomer was dissolved into 25 ml of nitrobenzene. The resulting solution was mixed with 25 ml of dichloromethane solution in which 0.16 g of MoO$_2$(acac)$_2$ as catalyst (catalyst/monomer=1/10 (molar ratio)), 5.70 g of trifluoroacetic acid and 0.75 g of trifluoromethanesulfonic anhydride were dissolved. The resulting mixture was reacted at 20° C. for 20 hours. The reaction solution was dropped into acidic methanol containing hydrochloric acid to produce a white precipitate. The precipitate was purified by dissolving i N-methylpyrrolidone and reprecipitating with methanol. As the result, 0.31 g of poly(2-methylphenylene sulfide) powder (or poly(2-methylphenylene thioether) powder) was obtained. The resulting product had a yield of 23%, a melting point of 155° C., and a number average molecular weight of 4300.

The result of anlyzing said product were as follows.

| IR Spectrum: | $\nu_{C-H}$ = 2850, 2910, 2970 cm$^{-1}$ |
| --- | --- |
| | $\nu_{C=C}$ = 1380, 1460, 1580 cm$^{-1}$ |
| | $\delta_{C-H}$ = 820, 875 cm$^{-1}$ |
| $^1$H-NMR: | $\delta$(—CH$_3$) = 2.35 ppm |
| | $\delta$(phenyl) = 7.15 ppm |
| Elementary Analysis | C; 67.7% (68.9%) |
| (values in parentheses | H; 4.98% (4.92%) |
| are calculated) | S; 25.9% (26.2%) |

EXAMPLE 4

In atmosphere, 1.09 g of diphenyl disulfide as monomer was dissolved into 50 ml of 1,1,2,2-tetrachloroethane. To the resulting solution, 0.1 g of WO$_2$(acac)$_2$ as catalyst (catalyst/monomer=1/20 (molar ratio)), 0.08 g of trifluoromethanesulfonic acid and 4.02 g of trifluoroacetic acid were added, and then the resulting mixture was reacted at 100° C. for 20 hours.

The reaction solution was dropped into acidic methanol containing hydrochloric acid to produce a white precipitate. The precipitate was purified by dissolving in N-methylpyrrolidone and reprecipitating with methanol. As the result, 0.67 g of poly(p-phenylenesulfide) powder was obtained. The yield of the resulting product was 61% and the melting point was 181° C. The result of IR and Elementary Analysis were identical with those in Example 1, which confirmed that the product was poly(p-phenylenesulfide).

EXAMPLE 5

At an oxygen pressure of 1 atm, 1.37 g of bis(2-methylphenyl) disulfide and 1.09 g of diphenyl disulfide as monomers were dissolved into 50 ml of dichloromethane, and mixed with 0.13 g of vanadyl acetylacetonato as catalyst (catalyst/monomers=1/40 (molar ratio)), 0.08 g of trifluoromethansulfonic acid and activated alumina, and then the resulting mixture was stirred for 50 hours at −20° C. The reaction solution was dropped into acidic methanol containing hydrochloric acid to produce a white precipitate. The precipitate was purified by dissolving in N-methylpyrrolidone and reprecipitating with methanol. As the result, 2.09 g of poly(2-methylphenylenesulfide-phenylenesulfide) powder, that is the copolymer of 2-methylphenylenesulfide and phenylenesulfide.

Said powder has a yield of 85% and a melting point of 242° C.

The result of analyzing the resulting product is as follows.

| IR Spectrum: | $\nu_{C-H}$ = 2850, 2910, 3050 cm$^{-1}$ |
| --- | --- |
| | $\nu_{C=C}$ = 1385, 1440, 1475, 1575 cm$^{-1}$ |
| | $\delta_{C-H}$ = 820, 875 cm$^{-1}$ |
| Elementary Analysis | C; 68.3% (67.8%) |
| (values in parentheses | H; 4.61% (4.32%) |
| are calculated) | S; 26.6% (27.8%) |

INDUSTRIAL APPLICABILITY

The process of the present invention can be carried out under very mild reaction conditions with simple and easy procedures. And it is industrially advantageous in that very inexpensive material and catalyst can be used. Particularly, the present invention is advantageous in providing a polyarylene thioether which is substantially a straight-chain one, and contains little cross-linkage.

What is claimed is:

1. A process for preparing a polyarylene thioether, which comprises oxidation coupling polymerizing, with oxygen, at least one compound selected from the group consisting of diaryl disulfides represented by the formula (I):

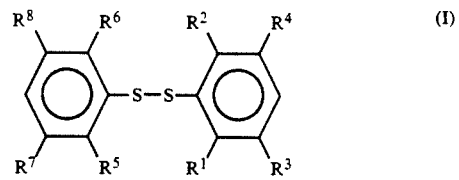

wherein, P/S indicates a sulfur atom,
R$^1$ to R$^8$ are identical or different from each other and each is a hydrogen atom, an alkyl group having 1 to 10 carbon atoms, a halogen atom or an alkoxyl group having 1 to 10 carbon atoms, with at least one catalyst selected from the group consisting of vanadyl acetylacetonato, vanadyltetraphenyl porphyrin, vanadium acetylacetonato, vanadyl porphyrin, vanadium porphyrin, oxymolybdenum acetylacetonato and oxytungsten acetylacetonato, in the presence of an acid.

2. The process for preparing a polyarylene thioether according to wherein the polyarylene thioether is free of alkali metals, copper, and nitrogen.

3. The process for preparing a polyarylene thioether according to claim 1, wherein the oxidation coupling polymerizing by oxygen at atmospheric pressure.

4. The process for preparing a polyarylene thioether according to claim 1, wherein R$^1$ and R$^8$ are each a hydrogen atom, a methyl group, an ethyl group, fluorine, chlorine or a methoxyl group.

5. The process for preparing a polyarylene thioether according to claim 1 wherein the compound is a diaryl disulfide selected from the group consisting of diphenyl disulfide, 2,2'-dimethyldiphenyl disulfide, 3,3'-dimethyldiphenyl disulfide, 2,2',6,6'-tetramethyldiphenyl disulfide, 2,2',3,3'-tetramethyldiphenyl disulfide, 2,2',5,5'-tetramethyldiphenyl disulfide, 3,3',5,5'-tetramethyldiphenyl disulfide, 2,2',3,3',5,5'-hexamethyldiphenyl disulfide, 2,2',3,3',6,6'-hexamethyldiphenyl disulfide, 2,2',3,3',5,5',6,6'-octamethyldiphenyl disulfide, 2,2'-diethyldiphenyl disulfide, 3,3'-diethyldiphenyl disulfide, 2,2',6,6'-tetraethyldiphenyl disulfide 2,2',3,3',6,6'-hexaethyldiphenyl disulfide, 2,2',3,3',5,5',6,6'-octaethyldiphenyl disulfide, 2,2'-dipropyldiphenyl disulfide, 3,3'-dipropyldiphenyl disulfide, 2,2',5,5'-tetrapropyldiphenyl disulfide, 2,2'-dibutyldiphenyl disulfide, 2,2'-dipentyldiphenyl disulfide, 2,2'-dihexyldiphenyl disulfide, 2,2'-difluorodiphenyl disulfide, 2,2'-dichlorodiphenyl disulfide, 2,2'-dibromodiphenyl disulfide, 2,2'-diiododiphenyl disulfide, 3,3'-difluorodiphenyl disulfide, 3,3'-dichlorodiphenyl disulfide, 3,3'-dibromodiphenyl disulfide, 3,3'-diiododiphenyl disulfide, 2,2',3,3'-tetrafluorodiphenyl disulfide, 2,2',3,3'-tetrachlorodiphenyl disulfide, 2,2',5,5'-tetrafluorodiphenyl disulfide, 2,2',5,5'-tetrachlorodiphenyl disulfide, 2,2',6,6'-tetrafluorodiphenyl disulfide, 2,2',6,6'-tetrachlorodiphenyl disulfide, 2,2',6,6'-tetrabromodiphenyl disulfide, 3,3',5,5'-tetrafluorodiphenyl disulfide, 3,3',5,5'-tetrachlorodiphenyl disulfide, 2,2',3,3',5,5'-hexafluorodiphenyl disulfide, 2,2',3,3',5,5'-hexachlorodiphenyl disulfide, 2,2',3,3',6,6'-hexafluorodiphenyl disulfide, 2,2',3,3',6,6'-hexachlorodiphenyl disulfide, 2,2',3,3'5,5',6,6'-octafluorodiphenyl disulfide, 2,2',3,3',5,5',6,6'-octoachlorodiphenyl disulfide, 2,2'-dimethoxydiphenyl disulfide, 2,2'-diethoxydiphenyl disulfide, 2,2'-diisopropoxydiphenyl disulfide, 2,2'-dipropoxydiphenyl disulfide, 2,2'-dibutoxydiphenyl disulfide, 2,2',3,3'-tetramethoxydiphenyl disulfide, 2,2',6,6'-tetramethoxydiphenyl disulfide, 2,2',6,6'-tetraethoxydiphenyl disulfide, 3,3'-dimethoxydiphenyl disulfide, 2,2'5,5'-tetramethoxydiphenyl disulfide; 2-methyldiphenyl disulfide, 2-ethyldiphenyl disulfide, 2-propyldiphenyl disulfide, 2-butyldiphenyl disulfide, 2-fluorodiphenyl disulfide, 2-chlorodiphenyl disulfide, 2-methoxydiphenyl disulfide, 2,6-dimethyldiphenyl disulfide, 2,6-diethyldiphenyl disulfide, 2,6-difluorodiphenyl disulfide, 2,3-dimethyldiphenyl disulfide, 2,3,5,6-tetrafluorodiphenyl disulfide, 2,3,5,6-tetramethyldiphenyl disulfide, 2,3,6-trimethyldiphenyl disulfide, 2,6-dimethyl-2'-methyldiphenyl disulfide, 2,6-dimethyl-2'-ethyldiphenyl disulfide, 2,6-dimethyl-2',3',5',6'-tetrafluorodiphenyl disulfide, 2,6-dimethyl-2'-methoxydiphenyl disulfide, 2,6-diethyl-2'-methyldiphenyl disulfide, 2,6-diethyl-2'-ethyldiphenyl disulfide, 2,6-diethyl-2',3',5',6'-tetrafluorodiphenyl disulfide, 2,6-dimethyl-2',6'-diethyldiphenyl disulfide, 2,6-dimethyl-2',6'-difluorodiphenyl disulfide and 2,3,5,6-tetramethyl-2',3',5',6'-tetrafluorodiphenyl disulfide.

6. The process for preparing a polyarylene thioether according to claim 5, wherein the catalyst is selected from the group consisting of vanadyl acetyl acetonato and vanadyltetraphenyl porphyrin.

7. The process for preparing a polyarylene thioether according to claim 6, wherein the acid is selected from the group consisting of hydrochloric acid, hydrobromic acid, prussic acid, sulfuric acid, phosphoric acid, chloric acid, bromic acid nitric acid, carbonic acid, boric acid, molybdic acid, isopoly-acid, heteropoly-acid, proton-containing heteropoly-acid, monomethylsulfuric acid, trifluoromethylsulfuric acid, acetic acid, propionic acid, butanoic acid, succinic acid, benzoic acid, phthalic acid, monochloroacetic acid, dichloroacetic acid, trichloroacetic acid, monofluoroacetic acid, difluoroacetic acid, trifluoroacetic acid, methanesulfonic acid, ethanesulfonic acid, propanesulfonic acid, benzenesulfonic acid, toluenesulfonic acid, trifluoromethanesulfonic acid, and benzenedisulfonic acid.

8. The process for preparing a polyarylene thioether according to claim 6, wherein the acid is selected from the group consisting of sulfuric acid, trifluoroacetic acid and trifluoromethane sulfonic acid.

9. The process for preparing a polyarylene thioether according to claim 8, wherein the catalyst and the diaryl disulfide are in a ratio of 5 to 0.00001.

10. The process for preparing a polyarylene thioether according to claim 9, wherein the oxidation coupling polymerizing comprises polymerizing at a temperature of −5° to +150° C. and for a period of time of 0.5 to 100 hours.

11. The process for preparing a polyarylene thioether according to claim 1, wherein the oxidation coupling polymerizing by oxygen comprises polymerizing in air.

12. The process for preparing a polyarylene thioether according to claim 8, wherein the catalyst and the diaryl disulfide are in a ratio of 1 to 0.0005.

13. The process for preparing a polyarylene thioether according to claim 8, wherein the catalyst and the diaryl disulfide are in a ratio of 0.1 to 0.0005.

14. The process for preparing a polyarylene thioether according to claim 12, wherein the oxidization coupling polymerizing comprises polymerizing at −5° to +150° C. for 0.5 to 100 hours.

15. The process for preparing a polyarylene thioether according to claim 13, wherein the oxidization coupling polymerizing comprises polymerizing at −5° to +150° C. for 0.5 to 100 hours.

* * * * *